(12) United States Patent
Almaraz

(10) Patent No.: US 11,820,346 B2
(45) Date of Patent: Nov. 21, 2023

(54) BRAKE WEAR GAUGE ASSEMBLY

(71) Applicant: Aldo Almaraz, San Pedro, CA (US)

(72) Inventor: Aldo Almaraz, San Pedro, CA (US)

( * ) Notice: Subject to any disclaimer, the term of this patent is extended or adjusted under 35 U.S.C. 154(b) by 378 days.

(21) Appl. No.: 17/210,584

(22) Filed: Mar. 24, 2021

(65) Prior Publication Data
US 2022/0306069 A1  Sep. 29, 2022

(51) Int. Cl.
*G01B 5/00* (2006.01)
*G01B 3/22* (2006.01)
*B60T 17/22* (2006.01)
*F16D 66/02* (2006.01)

(52) U.S. Cl.
CPC ............ *B60T 17/221* (2013.01); *F16D 66/02* (2013.01); *G01B 3/22* (2013.01); *G01B 5/0028* (2013.01)

(58) Field of Classification Search
CPC ......... B60T 17/221; F16D 66/02; G01B 3/22; G01B 5/0028; G01B 5/14
See application file for complete search history.

(56) References Cited

U.S. PATENT DOCUMENTS

| | | |
|---|---|---|
| D246,512 S | 11/1977 | McFarland |
| 5,608,376 A | 3/1997 | Ito |
| 6,237,723 B1 | 5/2001 | Salsman |
| 6,931,744 B1 * | 8/2005 | Ikerd, Jr ............. F16D 65/0043 33/501.45 |
| 7,040,151 B2 | 5/2006 | Graham |
| 7,066,302 B1 | 6/2006 | Talbert |
| 7,437,917 B1 * | 10/2008 | McNaughton ........... G01B 7/08 73/121 |
| 7,845,091 B2 * | 12/2010 | Clark ................... G01B 5/0028 33/806 |
| 9,500,462 B2 | 11/2016 | Reble |
| 2018/0188013 A1 * | 7/2018 | Garcia ................ F16D 65/0043 |
| 2022/0306069 A1 * | 9/2022 | Almaraz ............... B60T 17/221 |

FOREIGN PATENT DOCUMENTS

EP    0637697    10/1997

* cited by examiner

*Primary Examiner* — Yaritza Guadalupe-McCall

(57) ABSTRACT

A brake wear gauge assembly includes a plurality of wires that is each comprised of a bendable material such that each of the wires is retained in a desired shape for guiding between a brake rotor of a vehicle and a brake pad of a vehicle. A ring is provided that has each of the wires movably disposed thereon thereby facilitating the plurality of wires to be portable. A plurality of feeler gauges is each coupled to a respective one of the wires. Each of the feeler gauges can be inserted between the brake rotor and the brake pad and each of the feeler gauges has a unique measuring thickness with respect to each other. In this way the plurality of feeler gauges can measure a variety of distances between the brake rotor and the brake pad.

5 Claims, 4 Drawing Sheets

BRAKE WEAR GAUGE ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to gauge device and more particularly pertains to a new gauge device for inspecting a braking system of a vehicles. The device includes a plurality of bendable wires and a plurality of feeler gauges each coupled to a respective wire. In this way a respective one of the feeler gauges can be positioned between a brake rotor and a brake pad to measure a gap between the brake rotor and the brake pad.

(2) Description of Related Art Including Information Disclosed Under 37 CFR 1.97 and 1.98

The prior art relates to gauge devices including a variety of measuring tools for measuring a gap between a brake rotor and a brake pad. In each instance the measuring tools have a rigid construction. The prior art discloses a variety of measuring probes for measuring wear of a brake pad. The prior art discloses a measuring tool that includes a telescopic handle and a feeler gauge on the telescopic handle for measuring a gap between the brake rotor and the brake pad.

BRIEF SUMMARY OF THE INVENTION

An embodiment of the disclosure meets the needs presented above by generally comprising a plurality of wires that is each comprised of a bendable material such that each of the wires is retained in a desired shape for guiding between a brake rotor of a vehicle and a brake pad of a vehicle. A ring is provided that has each of the wires movably disposed thereon thereby facilitating the plurality of wires to be portable. A plurality of feeler gauges is each coupled to a respective one of the wires. Each of the feeler gauges can be inserted between the brake rotor and the brake pad and each of the feeler gauges has a unique measuring thickness with respect to each other. In this way the plurality of feeler gauges can measure a variety of distances between the brake rotor and the brake pad.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
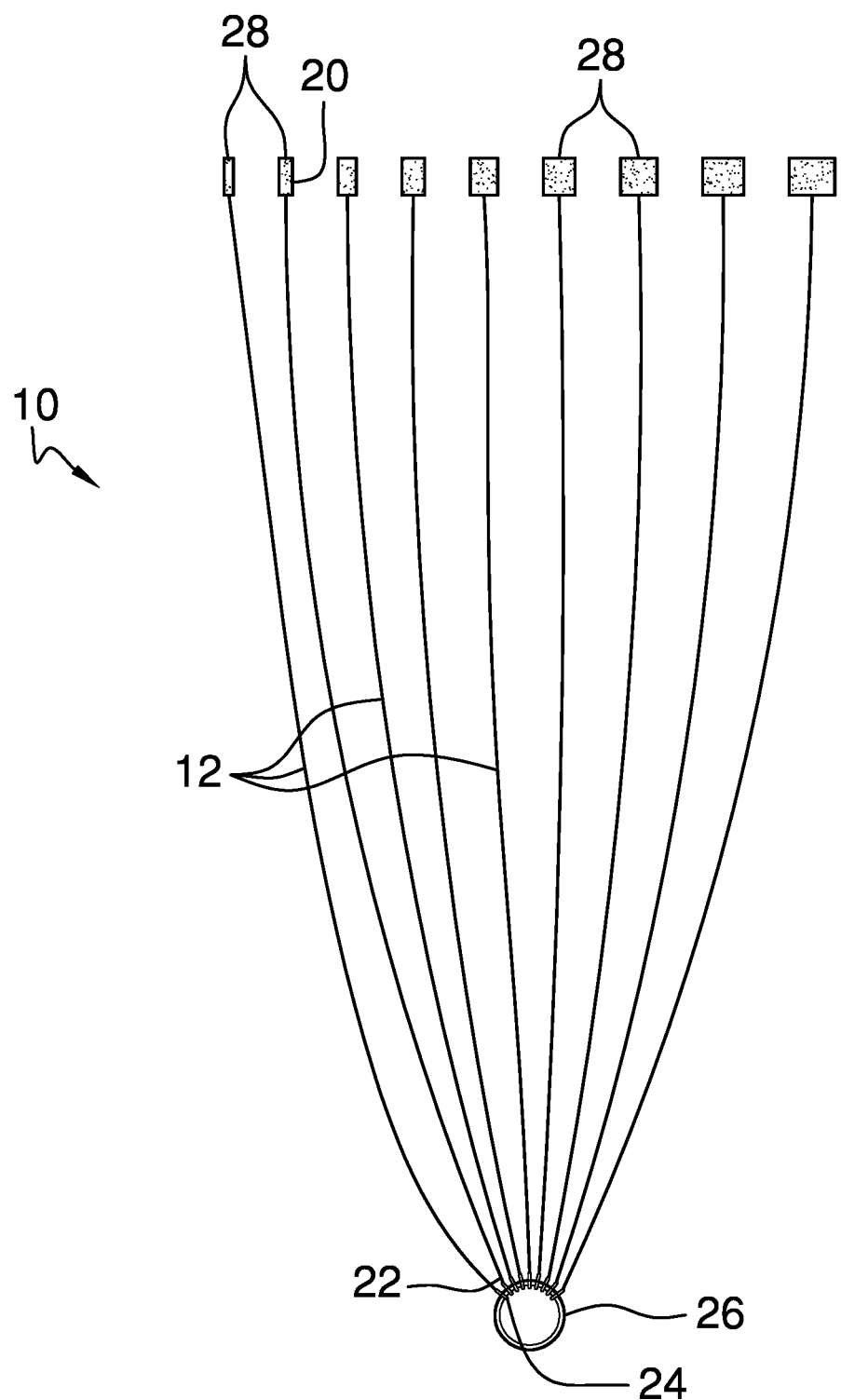
FIG. 1 is a perspective view of a brake wear gauge assembly according to an embodiment of the disclosure.
Figure 2:
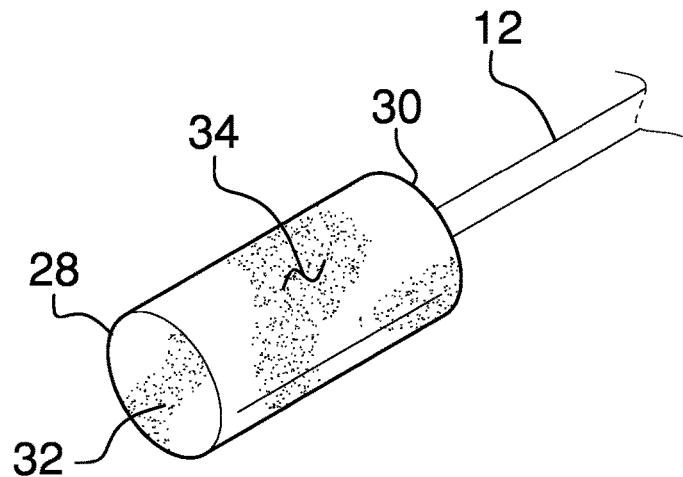
FIG. 2 is a front perspective view of a feeler gauge of an embodiment of the disclosure.
Figure 3:
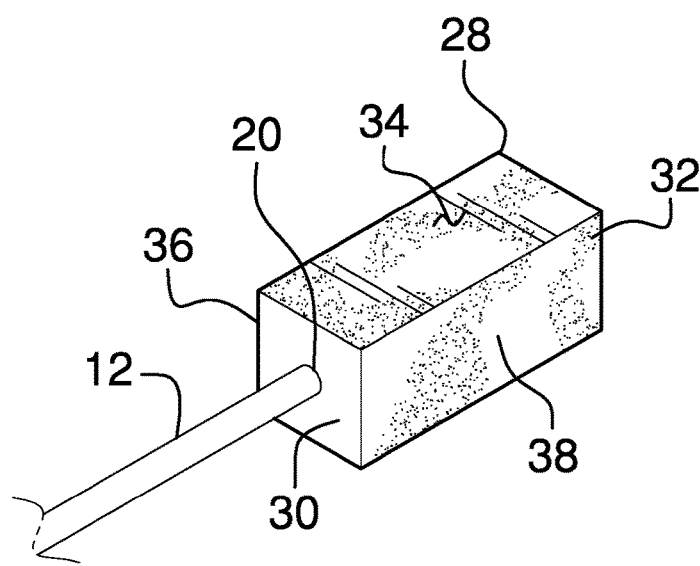
FIG. 3 is a back perspective view of a feeler gauge of an embodiment of the disclosure.
Figure 4:
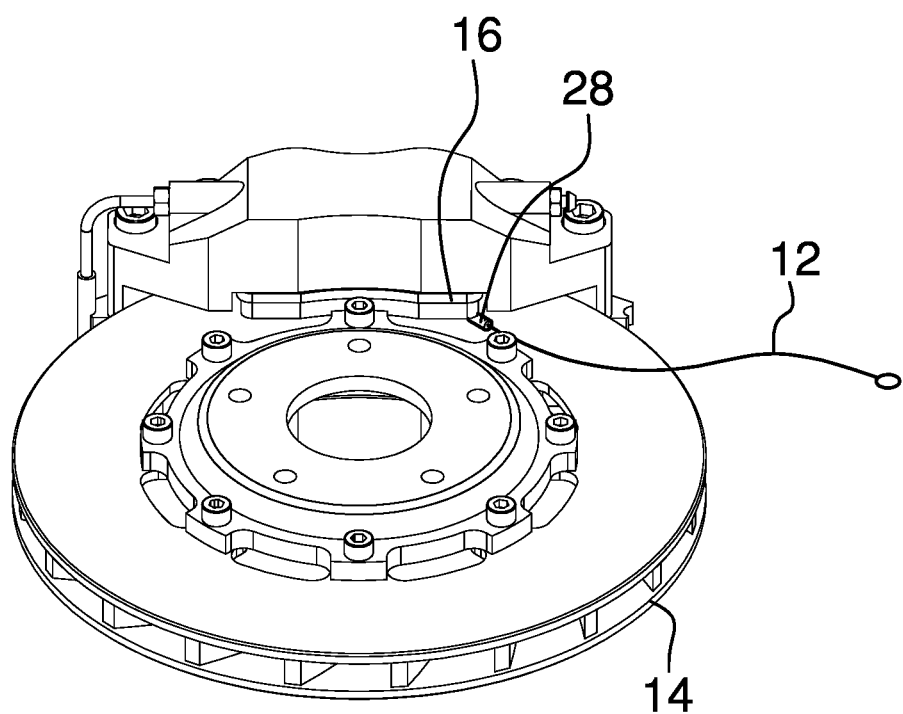
FIG. 4 is a perspective in-use view of an embodiment of the disclosure showing a feeler gauge being positioned between a brake rotor and a brake pad.
Figure 5:
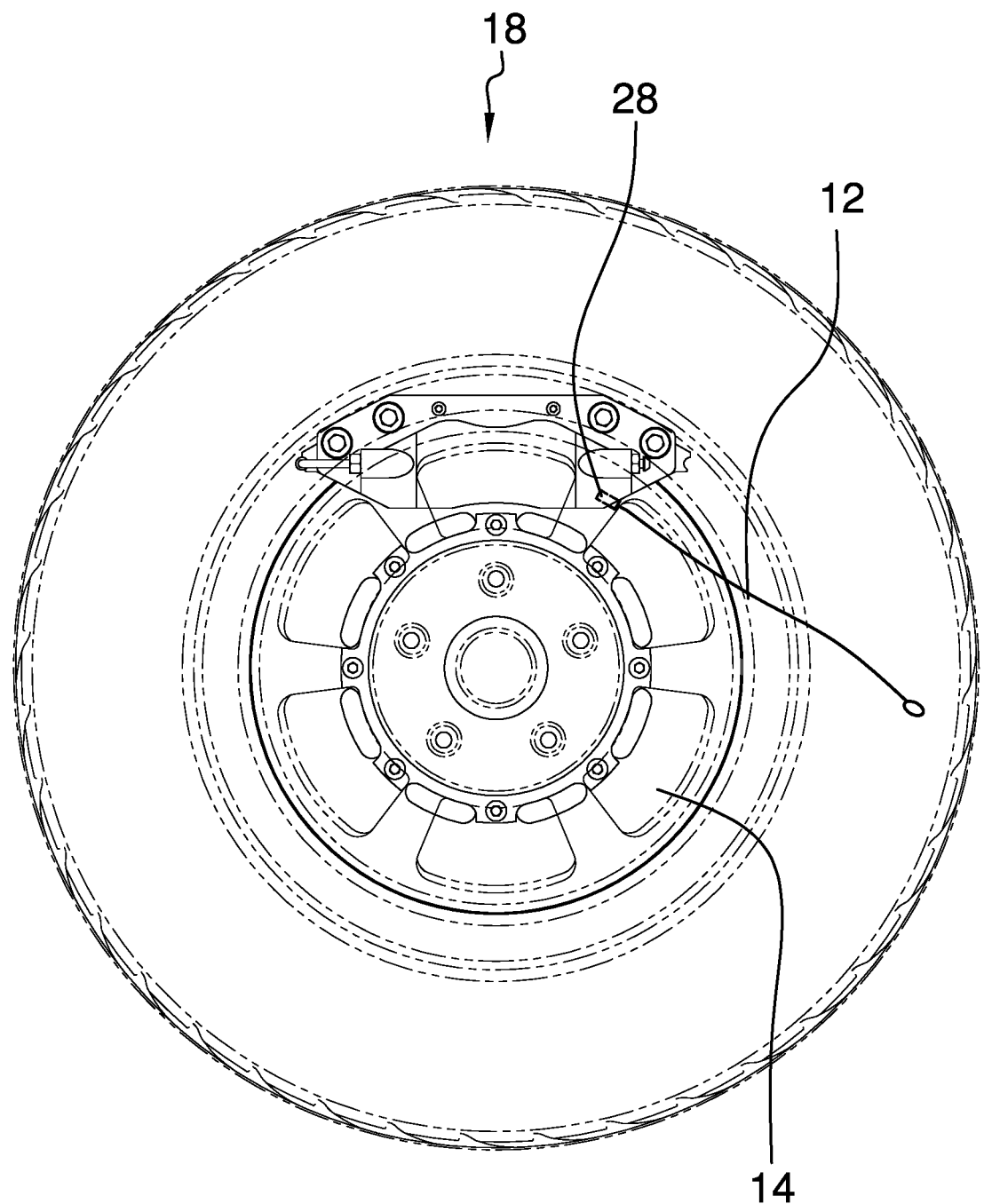
FIG. 5 is a perspective in-use view of an embodiment of the disclosure showing a wire being guided between spokes of a wheel.

With reference now to the drawings, and in particular to FIGS. 1 through 5 thereof, a new gauge device embodying the principles and concepts of an embodiment of the disclosure and generally designated by the reference numeral 10 will be described.

As best illustrated in FIGS. 1 through 5, the brake wear gauge assembly 10 generally comprises a plurality of wires 12 that is each comprised of a bendable material such that each of the wires 12 is retained in a desired shape. In this way each of the wires 12 can be shaped to facilitate a respective wire 12 to be guided between a brake rotor 14 of a vehicle 18 and a brake pad 16 of a vehicle 18. The vehicle 18 may be a passenger vehicle, a cargo vehicle or any other motorized vehicle that is driven on public roadways. Additionally, the brake rotor 14 and the brake pad 16 may be conventional components of the vehicle braking system.

Each of the wires 12 has a length of at least 8.0 inches to facilitate a respective one of the wires 12 to be positioned between the brake rotor 14 and the brake pad 16 without removing an associated tire from the vehicle 18. Each of the wires 12 has a first end 20 and a second end 22, and the second end 22 of each of the wires 12 has an engagement 24 that is attached thereto. A ring 26 is provided and each of the wires 12 is movably disposed on the ring 26. In this way the plurality of wires 12 to are portable. The engagement 24 on the second end 22 of each of the wires 12 has the ring 26 slidably extending therethrough.

A plurality of feeler gauges 28 is provided and each of the feeler gauges 28 is coupled to a respective one of the wires 12. In this way each of the feeler gauges 28 can be inserted between the brake rotor 14 and the brake pad 16 when the respective wire 12 is guided between the brake rotor 14 and the brake pad 16. Moreover, each of the feeler gauges 28 has a unique measuring thickness with respect to each other. In this way the plurality of feeler gauges 28 can measure a variety of distances between the brake rotor 14 and the brake pad 16.

Each of the feeler gauges 28 has a primary end 30, a secondary end 32 and an outside surface 34 extending therebetween. Each of the feeler gauges 28 is elongated between the primary end 30 and the secondary end 32, and the primary end 30 of each of the feeler gauges 28 is coupled to the first end 20 of the respective wire 12. The outside surface 34 of each of the feeler gauges 28 has a first side 36 and a second side 38 to define the measuring thickness between the first side 36 and the second side 38. As is most clearly shown in FIG. 3, each of the feeler gauges 28 may have a cuboid shape having each of the first side 36 and the second side 38 defining opposing sides of the cuboid shape. As is most clearly shown in FIG. 2, the outside surface 34 of each of the feeler gauges 28 may be continuously arcuate about an axis extending through said primary end 30 and said secondary end 32 such that the feeler gauges 28 have a cylindrical shape.

In use, a selected one of the wires 12 is shaped to facilitate the feeler gauge 28 on the selected wire 12 to be inserted between the brake rotor 14 and the brake pad 16. In this way the gap between the brake rotor 14 and the brake pad 16 can be measured without the need to disassemble the braking system. Thus, the degree of wear of the brake pad 16 can be identified to diagnose whether the brake pad 16 needs to be replaced. In this way an automotive technician can quickly inspect the braking system of the vehicle 18 and make servicing recommendations. As is most clearly shown in FIG. 5, the wires 12 have sufficient length to facilitate a respective wire 12 to be extended between spokes 40 on a wheel 42, for example, to access the braking system.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A brake wear gauge assembly for checking the degree of wear on brake pads of a vehicle, said assembly comprising:
   a plurality of wires, each of said wires being comprised of a bendable material such that each of said wires is retained in a desired shape wherein each of said wires is configured to be guided between a brake rotor of a vehicle and a brake pad of a vehicle;
   a ring having each of said wires being movably disposed thereon thereby facilitating said plurality of wires to be portable;
   a plurality of feeler gauges, each of said feeler gauges being coupled to a respective one of said wires wherein each of said feeler gauges is configured to be inserted between the brake rotor and the brake pad when said receptive wire is guided between the brake rotor and the brake pad, each of said feeler gauges having a unique measuring thickness with respect to each other wherein said plurality of feeler gauges is configured to measure a variety of distances between the brake rotor and the brake pad; and
   wherein each of said wires has a length of at least 8.0 inches wherein said plurality of wires is configured to facilitate a respective one of said wires to be positioned between the brake rotor and the brake pad without removing an associated tire from the vehicle.

2. The brake wear gauge assembly of claim 1, further comprising:
   each of said wires having a first end and a second end, said second end of each of said wires having an engagement being attached thereto;
   said engagement on said second end of each of said wires having said ring slidably extending therethrough; and
   each of said feeler gauges having a primary end, a secondary end and an outside surface extending therebetween, each of said feeler gauges being elongated between said primary end and said secondary end, said primary end of each of said feeler gauges being coupled to said first end of said respective wire, said outside surface of each of said feeler gauges having a first side and a second side to define said measuring thickness between said first side and said second side.

3. A brake wear gauge assembly for checking the degree of wear on brake pads of a vehicle, said assembly comprising:
   a plurality of wires, each of said wires being comprised of a bendable material such that each of said wires is retained in a desired shape wherein each of said wires is configured to be guided between a brake rotor of a vehicle and a brake pad of a vehicle;
   a ring having each of said wires being movably disposed thereon thereby facilitating said plurality of wires to be portable;
   a plurality of feeler gauges, each of said feeler gauges being coupled to a respective one of said wires wherein each of said feeler gauges is configured to be inserted between the brake rotor and the brake pad when said receptive wire is guided between the brake rotor and the brake pad, each of said feeler gauges having a unique measuring thickness with respect to each other wherein said plurality of feeler gauges is configured to measure a variety of distances between the brake rotor and the brake pad;
   wherein each of said wires has a first end and a second end, said second end of each of said wires having an engagement being attached thereto; and wherein said engagement on said second end of each of said wires has said ring slidably extending therethrough.

4. The assembly according to claim 3, wherein each of said feeler gauges has a primary end, a secondary end and an outside surface extending therebetween, each of said feeler gauges being elongated between said primary end and said secondary end, said primary end of each of said feeler gauges being coupled to said first end of said respective wire.

5. A brake wear gauge assembly for checking the degree of wear on brake pads of a vehicle, said assembly comprising:

a plurality of wires, each of said wires being comprised of a bendable material such that each of said wires is retained in a desired shape wherein each of said wires is configured to be guided between a brake rotor of a vehicle and a brake pad of a vehicle;

a ring having each of said wires being movably disposed thereon thereby facilitating said plurality of wires to be portable;

a plurality of feeler gauges, each of said feeler gauges being coupled to a respective one of said wires wherein each of said feeler gauges is configured to be inserted between the brake rotor and the brake pad when said receptive wire is guided between the brake rotor and the brake pad, each of said feeler gauges having a unique measuring thickness with respect to each other wherein said plurality of feeler gauges is configured to measure a variety of distances between the brake rotor and the brake pad; and wherein each of said feeler gauges has an outside surface, said outside surface of each of said feeler gauges having a first side and a second side to define said measuring thickness between said first side and said second side.

* * * * *